United States Patent
Ellsworth et al.

(10) Patent No.: US 7,373,837 B2
(45) Date of Patent: May 20, 2008

(54) TENSION MEASUREMENT SYSTEM AND METHOD

(75) Inventors: David G. Ellsworth, Kent, WA (US); Robert E. Stack, Sumner, WA (US); Scot D. Fisher, Renton, WA (US)

(73) Assignee: The Boeing Company, Chicago, IL (US)

( * ) Notice: Subject to any disclaimer, the term of this patent is extended or adjusted under 35 U.S.C. 154(b) by 707 days.

(21) Appl. No.: 10/801,000

(22) Filed: Mar. 16, 2004

(65) Prior Publication Data
US 2005/0209034 A1   Sep. 22, 2005

(51) Int. Cl.
*G01N 3/08* (2006.01)
(52) U.S. Cl. ........................................................ 73/828
(58) Field of Classification Search .................. 73/828
See application file for complete search history.

(56) References Cited
U.S. PATENT DOCUMENTS

| | | | |
|---|---|---|---|
| 3,728,896 A | 4/1973 | Sheldon et al. ............... 73/136 |
| 3,968,754 A | 7/1976 | Lanfermann et al. ....... 104/172 |
| 4,036,069 A * | 7/1977 | Clark .......................... 474/135 |
| 4,646,402 A | 3/1987 | Gierse et al. ................... 26/86 |
| 4,983,144 A | 1/1991 | Ojima ......................... 474/111 |
| 5,167,159 A * | 12/1992 | Lucking ................ 73/862.451 |
| 5,425,678 A * | 6/1995 | Richardson ................... 474/82 |
| 5,624,162 A * | 4/1997 | Guse et al. ................... 299/1.6 |
| 6,007,275 A * | 12/1999 | Børseth ....................... 405/224 |
| 6,029,798 A * | 2/2000 | Miller ................... 198/810.01 |
| 6,178,824 B1* | 1/2001 | Hayakawa et al. ........... 73/828 |
| 6,422,271 B1* | 7/2002 | Mitchell et al. .......... 140/71 R |

* cited by examiner

*Primary Examiner*—Max Noori
(74) *Attorney, Agent, or Firm*—Baker & Hostetler LLP

(57) ABSTRACT

Tension within a power transfer system is measured by tension evaluator that includes an actuator, a first sensor, and a second sensor. The actuator applies a first load and a second load to a chain. The chain is moved a first amount of deflection in response to the first load and the chain is moved a second amount of deflection in response to the second load. The first sensor senses an event. A third amount of deflection is associated with the event. The second sensor senses an amount of travel of the chain between the second amount of deflection and the third amount of deflection.

6 Claims, 4 Drawing Sheets

TENSION MEASUREMENT SYSTEM AND METHOD

FIELD OF THE INVENTION

The present invention generally relates to measurement of tension. More particularly, the present invention pertains to a tension measurement system and method of measuring tension in a power transfer device.

BACKGROUND OF THE INVENTION

Power transfer devices (PTDs) such as chains and belts are utilized in a multitude of machines. Typically, PTDs are separated into types based upon the type of impact encountered during operation. For example, belt and chain conveyors with relative small load fluctuation, centrifugal blowers, and the like generally fall into a smooth impact category. In contrast, presses, construction and mining machines, vibrating machines and the like fall into a high impact category. Between these categories, engines and other general machines are typically classified in a moderate impact category. To facilitate proper operation, these PTDs, are installed under a relatively precise amount of tension. In addition, the tension of the PTD is typically monitored periodically to facilitate continued proper operation and increase the longevity of the machine. The amount of tension varies according to the type of impact and load anticipated. In general, an insufficiently tensioned PTD is prone to slippage, excessive vibration, chain slap, and the like. While excessive tension may lead to accelerated bearing failure and breakage.

It can be important that PTDs are tensioned to a high degree of precision in some circumstances, for example, in relatively high technology applications, such as some in the aerospace industry. In this regard, conventional manners of measuring PTD tension generally involve a human operator with a spring gauge and a machinist ruler. The spring gauge is utilized to load the PTD a precise amount while the ruler or calipers are utilized to measure deflection of the PTD. However, mechanical areas of airframes are often quite cramped, making these measurements difficult and time consuming. In addition, without precise reference points from which to make these measurements, reproducibility is difficult to achieve.

Accordingly, it is desirable to provide a method and apparatus capable of tension measurement that overcomes the disadvantages described herein at least to some extent.

SUMMARY OF THE INVENTION

The foregoing needs are met, to a great extent, by the present invention, wherein in one respect an apparatus and method is provided that in some embodiments evaluates tension within a chain and sprocket assembly.

An embodiment of the present invention pertains to a tension evaluator including an actuator, a first sensor, and a second sensor. The actuator applies a first load and a second load to a chain. The chain is moved a first amount of deflection in response to the first load and the chain is moved a second amount of deflection in response to the second load. The first sensor senses an event. A third amount of deflection is associated with the event. The second sensor senses an amount of travel of the chain between the second amount of deflection and the third amount of deflection.

Another embodiment of the present invention pertains to an apparatus to measure an amount of tension in a chain and sprocket assembly. This apparatus includes an actuator, a load sensor, a deflection sensor, and a frame. The actuator deflects the chain. The load sensor senses load applied to the chain. The deflection sensor senses an amount of chain deflection. To the frame is mounted the actuator, the load sensor and the deflection sensor. This frame is attachable to the sprocket assembly.

Yet another embodiment of the present invention relates to an apparatus for evaluating tension. This apparatus includes a means for applying a first load to a chain, a means for applying a second load to the chain, means for sensing an event, means for sensing a travel, and a means for determining whether the travel is between a first value and a second value. The first load produces a first deflection of the chain. The second load produces a second deflection of the chain. The event is associated with a third deflection. The means for sensing the travel senses the travel of the chain between the second deflection and the third deflection.

Yet another embodiment of the present invention pertains to a method of determining tension in a chain and sprocket assembly. In this method, a chain tension measuring device is mounted on the sprocket assembly. This chain tension measuring device includes an actuator, a first sensor, and a second sensor. The actuator applies a preload and a test load to the chain. The chain is moved a first amount of deflection in response to the preload and the chain is moved a second amount of deflection in response to the test load. The first sensor senses a loss of contact between the chain and the actuator. A third amount of deflection is associated with the loss of contact. The second sensor senses an amount of travel of the chain between the second amount of deflection and the third amount of deflection. Additionally in this method, the preload is applied to the chain, the test load is applied to the chain, an initial position of the chain is determined, the actuator is retracted, and a final position of the chain is determined in response to the loss of contact.

Yet another embodiment of the present invention relates to a method of evaluating tension. In this method, a first load is applied to a chain, a second load is applied to the chain, an event is sensed, a travel is sensed, and it is determined whether the travel is between a first value and a second value. The first load produces a first deflection of the chain. The second load produces a second deflection of the chain. The event is associated with a third deflection. The travel of the chain is sensed between the second deflection and the third deflection.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a tension evaluator or tension measurement device and method. The tension evaluator includes an actuator such as, for example, a threaded rod, screw, pneumatic ram, servo motor, and/or the like. This actuator applies a load to the chain or belt of the power transfer system. In chain driven power transfer systems, the chain typically forms a circuit about two or more sprockets and is referred to as a sprocket assembly. In an embodiment of the invention, three different loads are applied to the chain during evaluation of the sprocket assembly. The first of these loads is relatively larger than the subsequent loads. This first load, or preload, substantially removes slack from the sprocket assembly and thus, improves reproducibility of the subsequent measurements. The second load, or test load, is relatively less than the preload and relatively greater than the third load. Each of these different loads produces a different amount of chain deflection.

The tension evaluator also includes a plurality of sensors. In particular, a linear potentiometer or other suitable measuring devices may be included to sense travel of the chain from one load to another. In an embodiment of the invention, the third load is essentially equal to zero Kilograms. To substantially ensure a load of zero Kilograms is applied, a contact is utilized to sense loss of contact between the chain and the actuator. However, in various other embodiments of the invention, the third load may be greater than, equal to, or less than zero. In this regard, the tension evaluator includes a load sensor such as a load cell or other such suitable load measuring device. It is also within the purview of this invention that the load sensor be incorporated into the actuator. For example, a pneumatic ram may be controlled by a proportional air valve to apply relatively precise amounts of load. Thus, the load cell is optionally included in the tension evaluator.

Another embodiment in accordance with the present invention provides a method of measuring tension in a sprocket assembly or other suitable power transfer system. In this method, the first load is applied to the chain or belt. This load is allowed to stabilize and the second load is applied to the chain or belt and allowed to stabilize. Once stable, the amount of chain deflection is sensed or reset to zero. In response to an event such as, for example, loss of contact between the chain and actuator or achieving the third load, the travel is sensed. In response to the sensed travel, it is determined whether the travel is between a first value and a second value.

Figure 1:
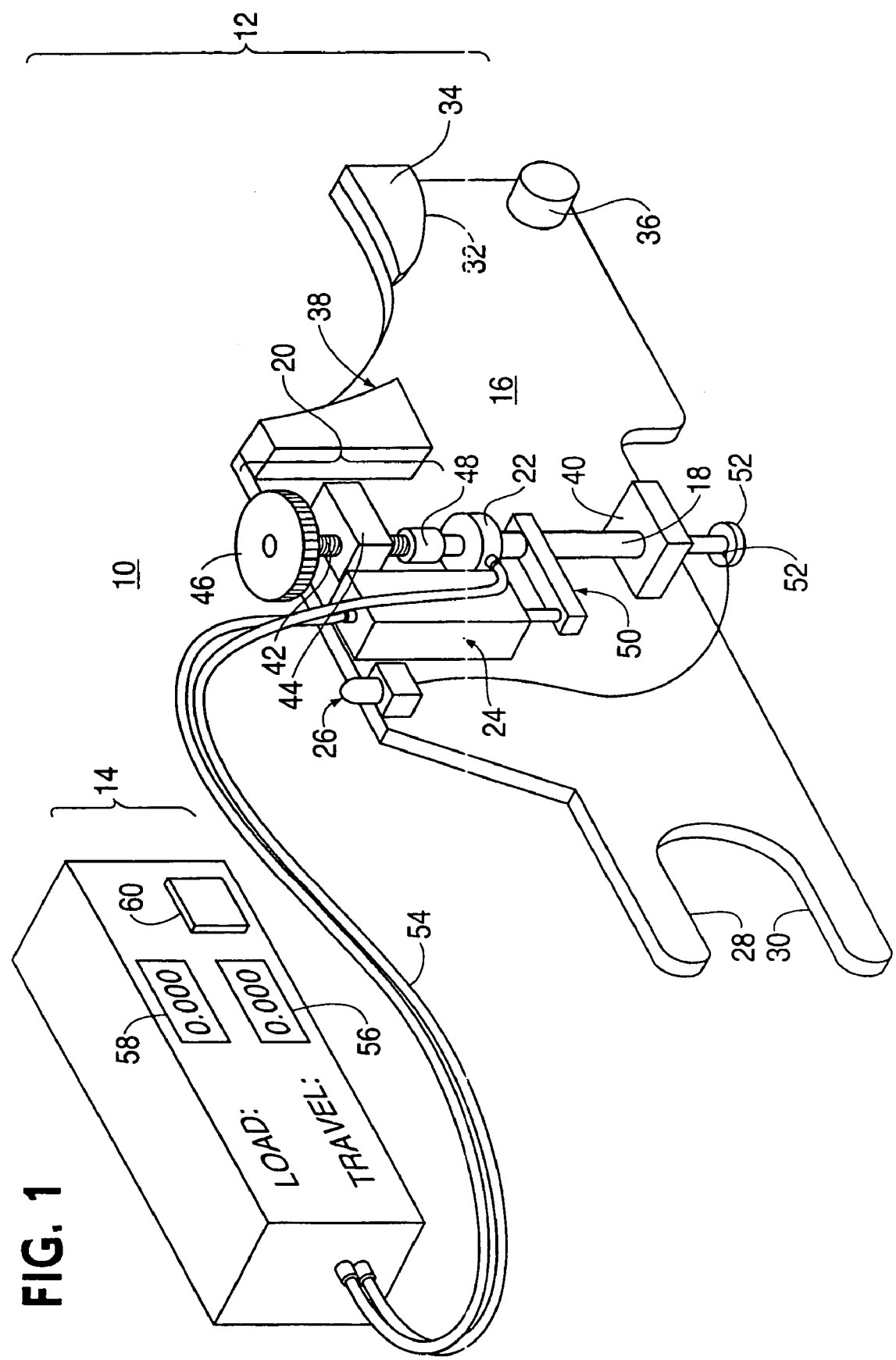
FIG. 1 is a perspective view of a chain tension measuring device according to an embodiment of the invention.

The invention will now be described with reference to the drawing figures, in which like reference numerals refer to like parts throughout. As shown in FIG. 1, a chain tension measuring device 10 ("CTMD"), in accordance with an embodiment of the invention, includes a tool 12 and a user interface 14. The tool 12 includes a frame 16, piston 18, actuator 20, load cell 22, linear potentiometer 24, indicator 26, and a plurality of engaging surfaces 28-38.

In various embodiments of the invention, the frame 12 is formed from a suitably rigid material such as, for example, plastic, metal, composite, or the like. In a particular embodiment, the frame is milled from a conductive metal. In this manner the frame may serve to complete an electrical circuit.

The piston 18 is configured to engage or rest securely upon a chain, belt, band or other such power transfer device (PTD). As shown in FIG. 1, the piston 18 is attached to the actuator 20 and operable to move in a linear manner. Lateral movement of the piston 18 is substantially prevented by a guide 40.

In various embodiments of the invention, the actuator 20 may include, for example, a threaded rod, pneumatic piston driven ram, electromagnetic ram, electric servomotor, or the like. As shown in FIG. 1, the actuator 20 includes a threaded rod 42 configured to mate with a tapped bore of a guide 44. This guide 44 also serves to substantially prevent lateral movement of the threaded rod 42. The actuator 20 further includes a knurled handle 46 to facilitate operation of the threaded rod 42. The actuator 20 optionally includes a swivel joint 48. If present, this swivel joint 48 essentially prevents torque applied to the threaded rod 42 from being applied to the load sensor 22.

The load sensor 22 may include various load or pressure sensing devices such as a load cell, pressure transducer, or any such suitable device. A particular example of a load sensor suitable for use in the CTMD 10 includes a Sensotec Model 31 load cell manufactured by Honeywell Sensotec of Columbus, Ohio, USA. The load sensor 22 is configured to sense changes in force and relay this information to the user interface 14.

The linear travel sensor 24 is configured to sense the position and/or linear travel of the piston 18 and relay this positional information to the user interface 14. For example, the linear travel sensor 24 may include a linear potentiometer. As shown in FIG. 1, the linear travel sensor 24 is attached to the piston 18 via an armature 50. However, in another embodiment of the invention, the attributes of the linear travel sensor 24 and actuator 20 may be subsumed within a single device. For example, an electric servomotor generally includes actuating and position sensing capabilities. In yet another embodiment, the linear travel sensor 24 may be an essentially autonomous component such as a micrometer, caliper, or the like. In this embodiment, positional measurement may be read off the linear travel sensor 24 directly.

Optionally, the tool 12 includes the indicator 26. If present, the indicator 26 is configured to emit a signal in response to a contact pad 52 making and/or breaking contact with a suitable surface. For example, the indicator 26 may include a light emitting diode (LED), power source, and lead. In response to contact with the suitable surface, a circuit is completed and light is emitted from the LED. The suitability of various surfaces is dependent upon the particular type of contact pad 52 as discussed in greater detail herein. As shown in FIG. 1, the indicator 26 is positioned on the tool 12 in a relatively visible location. In another embodiment, the indicator 26 may be positioned on the user interface 14.

The user interface 14 is configured to receive signals from some or all of the various electronic components of the tool 12. In this regard, the user interface 14 includes a cable 54. Additionally, the user interface 14 is configured to provide power to these components. For example, the user interface 14 may include a plug and/or independent power supply such as a battery or fuel cell. Furthermore, the user interface 14 includes one or more displays 56 and 58 to present information to a user. As shown in FIG. 1, the display 56 displays an amount of travel in response to signals from the linear travel sensor 24. Moreover, the user interface 14 may include one or more switches, buttons and the like. In a particular example, the user interface 14 includes a button 60 to reset or "zero" the amount of travel shown in the display 56. Other suitable buttons and/or switches include a power switch to turn on the CTMD 10, an actuator control switch, and the like.

Figure 2:
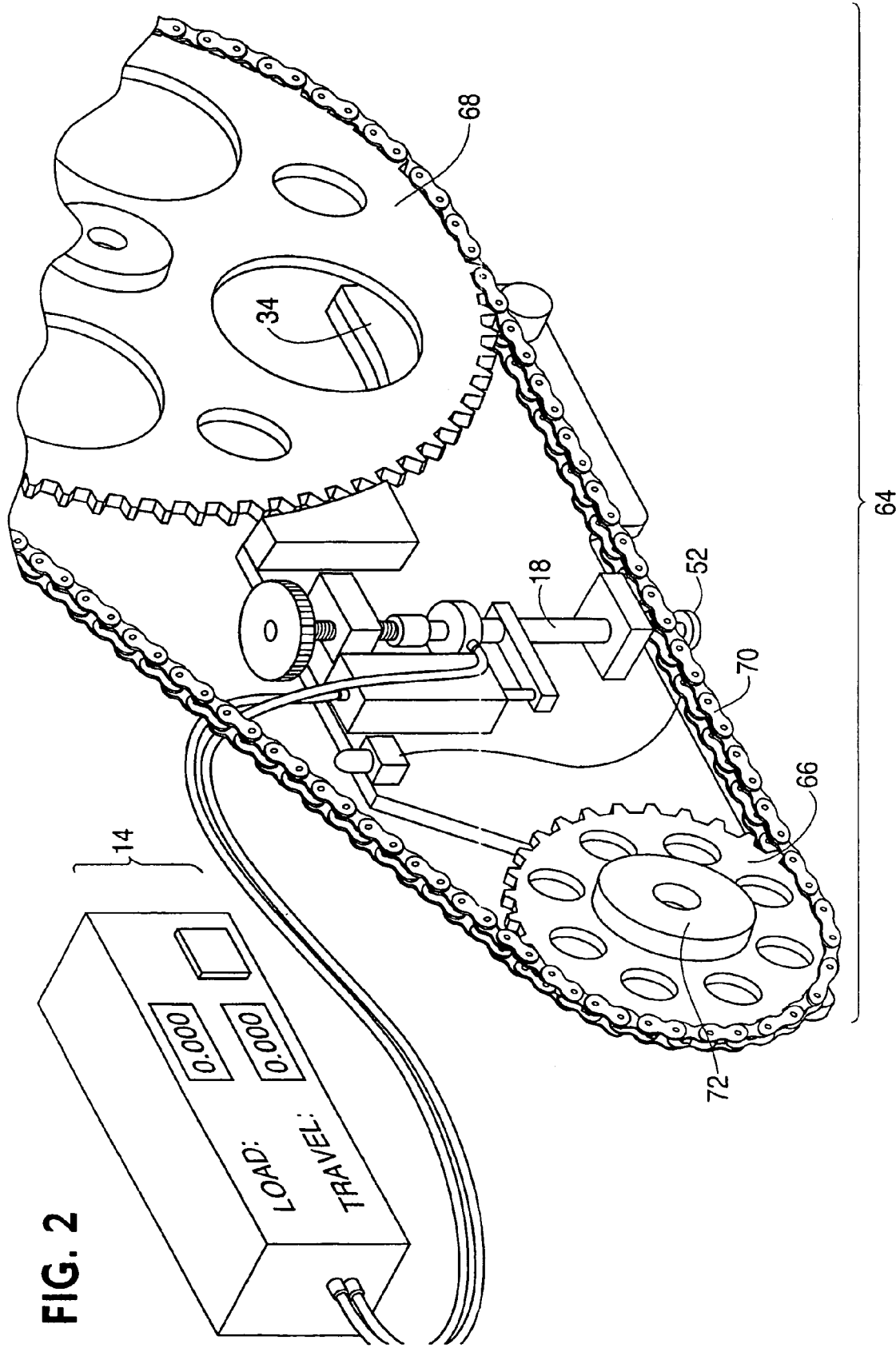
FIG. 2 is a perspective view of the chain tension measuring device according to FIG. 1 installed in a suitable sprocket assembly.

FIG. 2 is a perspective view of the CTMD 10 according to FIG. 1 installed in a suitable sprocket assembly 64. As shown in FIG. 2, the sprocket assembly 64 includes a plurality of sprockets 66 and 68. The sprocket assembly 64 also includes a chain 70 configured to transfer torque between the sprockets 66 and 68. In this regard, it is within the scope of the invention that the CTMD 10 is operable to measure tension in any suitable power transfer system. Thus, the sprocket assembly 64 is for illustrative purposes only. In various other embodiments, tension in a belt and pulley system, conveyor belt system, or the like may be measured by the CTMD 10.

The sprocket 66 includes a hub 72. The engaging surfaces 28 and 30 are configured to span the hub 72 with a minimal amount of clearance. In this manner, a first end of the tool 12 is positioned relative to the sprocket 66 with a substantially high degree of precision. Similarly, the engaging surfaces 32 to 38 are configured to engage various surfaces of the sprocket 68. In general, the engaging surfaces 32 to 38 work cooperatively to essentially secure the tool 12 to the sprocket assembly 64 in a positive, yet temporary manner. However, the exact nature of these engagements is dependent upon a variety of factors, such as: size and shape of the sprocket 68; distance between the sprocket 68 and the sprocket 66; and the like. To further facilitate positive engagement of the tool 12 to the sprocket assembly 64, a clamping device such as, for example, a spring clamp, "C" clamp, or the like, is optionally utilized. When utilized in the embodiment shown in FIG. 2, the clamping device is disposed such that the sprocket 68 is pressed firmly toward the engaging surface 34.

When the tool 12 is suitably disposed in relation to the sprocket assembly 64, the piston 18 is positioned such that forward movement of the piston 18 causes the contact pad 52 to contact the chain 70. Additional forward movement of the piston 18 causes deflection of the chain 70 in proportion to the load exerted on the piston 18. Furthermore, in response to a backward movement of the piston 18, deflection of the chain 70 is lessened. In response to sufficient backward movement of the piston 18, the contact pad 52 looses contact with the chain 70.

Figure 3:
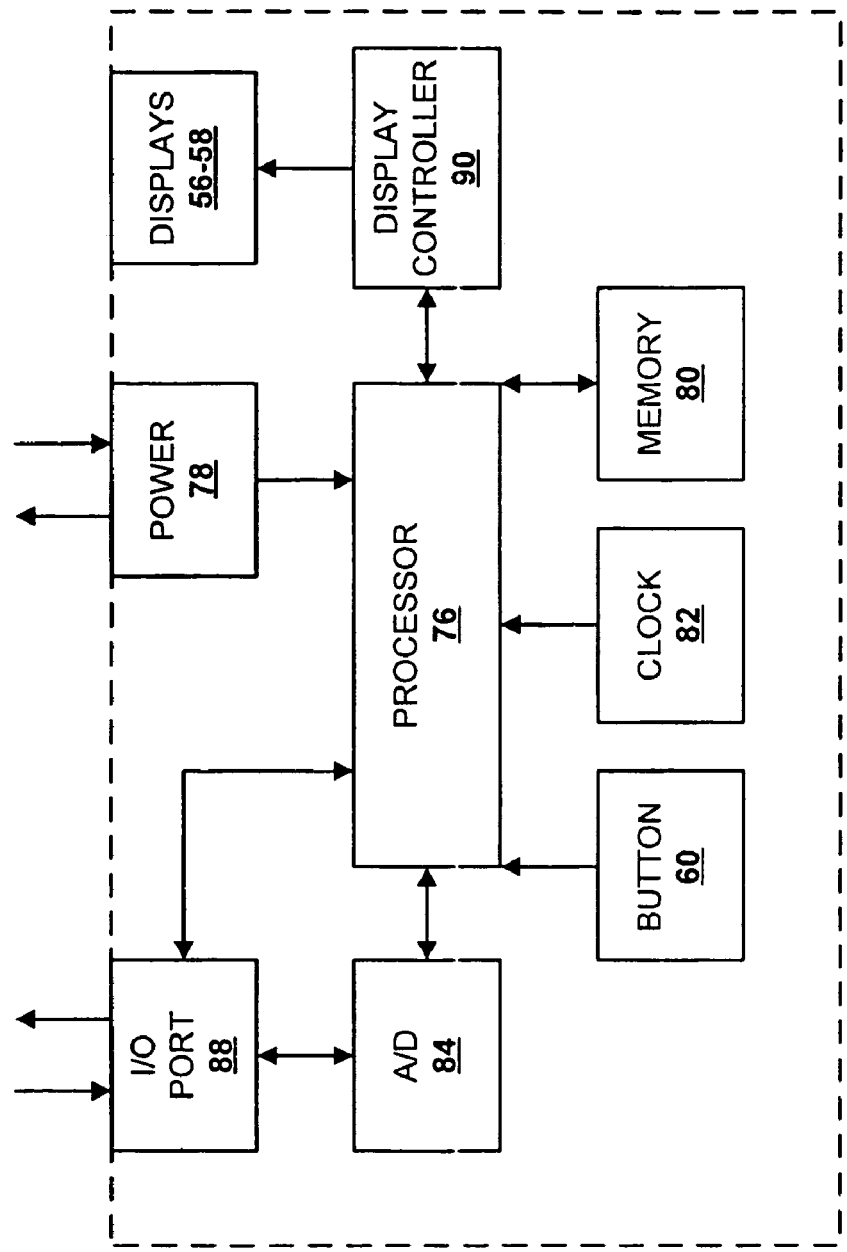
FIG. 3 is a system architecture for a chain tension measuring device according to an embodiment of the invention.

FIG. 3 is a system architecture for the CTMD 10. As shown in FIG. 3, the user interface 14 includes a processor 76. This processor 76 is operably connected to the button 60, a power supply 78, memory 80, clock 82, analog to digital converter (A/D) 84, input/output (I/O) port 88, and display controller 90. The I/O port 88 is configured to receive signals from any suitably attached electronic device and forward these signals to the A/D 84 and/or the processor 76. For example, the I/O port 88 may receive signals associated with load sensed by the load sensor 22 and forward the signals to the processor 76. If the signals are in analog format, the signals may proceed via the A/D 84. In this regard, the A/D 84 is configured to receive analog format signals and convert these signals into corresponding digital format signals. Conversely, the A/D 84 is configured to receive digital format signals from the processor 76, convert these signals to analog format, and forward the analog signals to the I/O port 88. In this manner, electronic devices configured to receive analog signals may intercommunicate with the processor 76.

The processor 76 is configured to receive signals from the linear travel sensor 24. These signals and signals from the load sensor 22 are utilized by the processor 76 and/or the display controller 90 to modulate the displays 56 and 58. The processor 76 is further configured to receive time signals from the clock 82. In addition, the processor 76 is configured to store and retrieve electronic data to and from the memory 80. Furthermore, in embodiments of the invention that include powered actuators, the processor 76 is configured to determine signals operable to modulate and thereby control the actuator 20 to exert a particular force. For example, a proportional air valve may be utilized to supply regulated gas to a pneumatic ram serving as the actuator 20. Signals associated with the pounds per square inch (psi) of gas supplied to the actuator 20 may be forwarded to this proportional air valve by the processor 76 via the I/O port 88.

According to an embodiment of the invention, the processor 76 is configured to reset the amount of travel displayed on the display 56 to zero in response to receiving a signal from the button 60. For example, the processor 76 may control the display controller 90 to generate signals configured to modulate the display 56. These signals are forwarded to the display 56 via the display controller 90.

According to another embodiment of the invention, the processor 76 is configured to communicate across a network via the I/O port 88. In this manner, information related to chain tension may be forwarded to other devices connected to the network.

Figure 4:
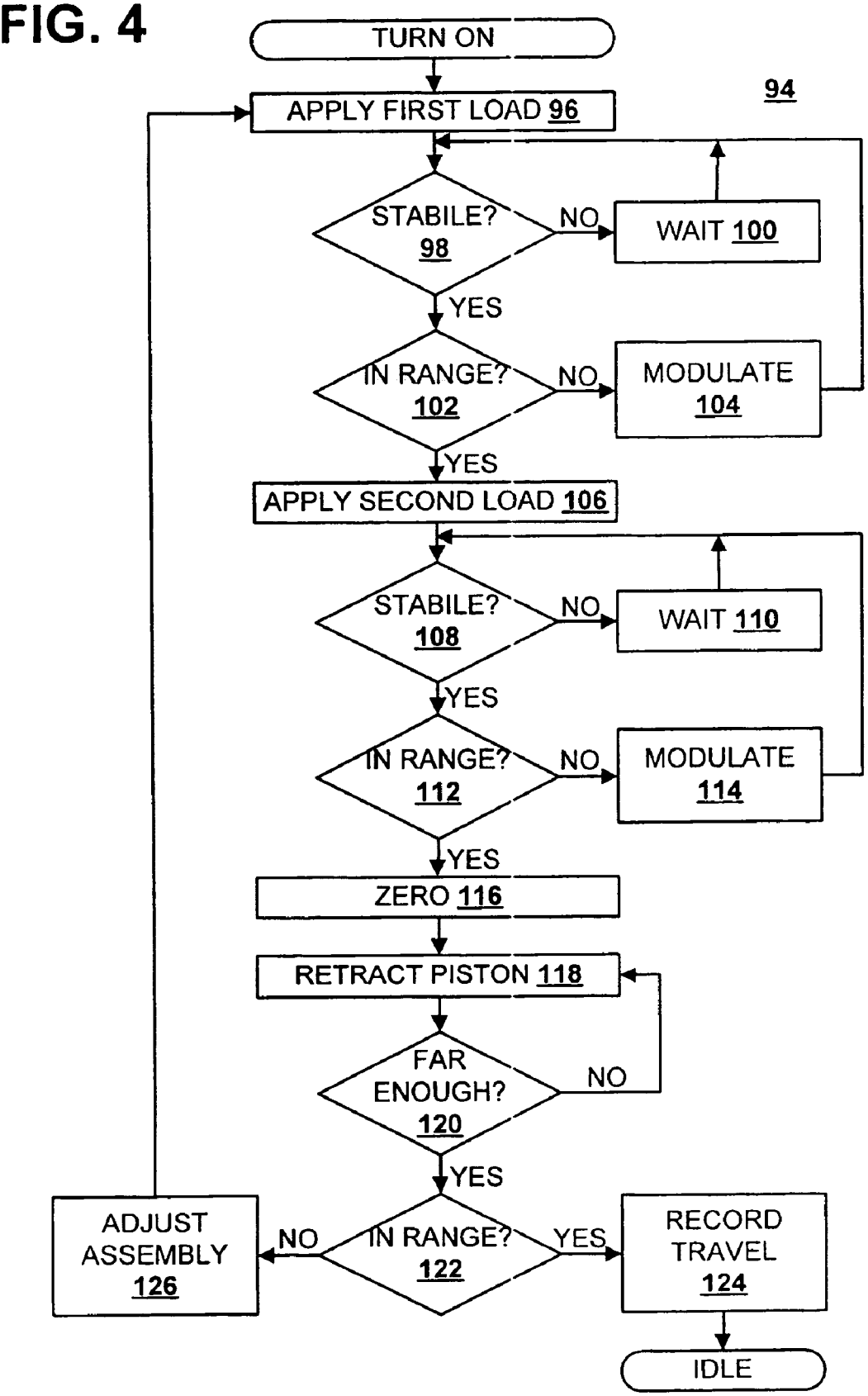
FIG. 4 is a flow diagram according to an embodiment of the invention.

FIG. 4 is a flow diagram of a method 94 for determining the tension of a chain in a sprocket assembly according to an embodiment of the invention. Prior to initiation of the method 94, a variety of tasks may be performed. These tasks include, in no particular order: verify correct function of all components of the CTMD 10; verify certification dates are valid for the load sensor 22 and the linear travel sensor 24; install the tool 12 in the sprocket assembly; verify proper operation of actuator 20 and piston 18; install a clamping device if applicable; and the like.

At step 96 a first load ($load_{1st}$) is placed on the chain 70. For example, the actuator 20 is modulated to advance the piston 18 toward the chain 70. In general, this $load_{1st}$ serves to pre-load the sprocket assembly 64. That is, any slack that may be present in the sprocket assembly 64 and/or the tool 12, is substantially removed by the application of the $load_{1st}$. In an embodiment of the invention, the $load_{1st}$ exceeds the value of a second, "testing" load. In this manner, removal of slack in the sprocket assembly 64 is facilitated to a greater extent. Specific values of suitable values for the $load_{1st}$ are dependent upon the particular sprocket assembly being tested. In general, it is preferable that $load_{1st}$ be sufficient to remove excess slack while not so great that the system incurs damage. Therefore, depending upon the sprocket assembly being tested, the $load_{1st}$ may be within a range of a few grams to 100 or more Kilograms (Kg). More preferably, the $load_{1st}$ is within a range of 1 to 10 Kg. In a particular example, the $load_{1st}$ is 2.72 Kg.

At step 98 it is determined if the $load_{1st}$ has stabilized. For example, the actuator 20 is controlled to maintain the position of the piston 18 and the sensed load is monitored. For example, if the sensed load fluctuates then it is determined that the load 15, has not reached an equilibrium state. In another example, if the sensed load essentially reaches an equilibrium then it is determined that the $load_{1st}$ has stabilized. In response to determining the $load_{1st}$ has not stabilized a wait time is allowed to elapse at step 100. In response to determining the $load_{1st}$ has stabilized it is determined whether the $load_{1st}$ is above a minimum load ($load_{1st\ min}$) and below a maximum load ($load_{1st\ max}$) at step 102.

At step 100 fluctuation or hysteresis of the $load_{1st}$ is resolved. In various embodiments of the invention, the hysteresis is resolved passively by allowing a wait time to elapse. For example, 30 seconds may be allowed to elapse. In other embodiments, the hysteresis is resolved actively by, for example, loading and unloading the chain 70, manipulating one or more of the sprockets 66 and 68, and the like. Following step 100, it is determined whether the $load_{1st}$ has stabilized at step 98.

At step 102 it is determined whether the $load_{1st}$ is above the $load_{1st\ min}$ and below the $load_{1st\ max}$. For example, if the sensed load is below 2.49 Kg then, it is determined that the $load_{1st}$ is below the $load_{1st\ min}$. In another example, if the sensed load is above 2.72 Kg then, it is determined that the $load_{1st}$ is above the $load_{1st\ max}$. In yet another example, if the sensed load is above 2.49 Kg and below 2.72 Kg then, it is determined that the $load_{1st}$ is within a suitable range. In response to determining the $load_{1st}$ is above the $load_{1st}$ max or below the $load_{1st}$ min then, the load placed upon the chain 70 is modulated at step 104. In response to determining the $load_{1st}$ is above the $load_{1st\ min}$ and below the $load_{1st\ max}$ then, a second "test" load ($load_{1st}$) is applied at step 106.

At step 104 the load upon the chain is adjusted. For example, if the sensed load is below the $load_{1st\ min}$ then, the actuator 20 is modulated to control the piston 18 to advance and thus, increase the load upon the chain 70. If, the sensed load is above the $load_{1st\ max}$ then, the actuator 20 is modulated to control the piston 18 to retract and thus, decrease the load upon the chain 70. Following the step 104, it is determined whether the sensed load has stabilized at step 98.

At step 106 the $load_{test}$ is applied to the chain 70. In general, the value of the $load_{test}$ is based upon the particular sprocket assembly being tested. More particularly, it is preferable that the $load_{test}$ be sufficient to cause a statistically significant amount of deflection in the chain 70. As such, factors contributing to the value of the $load_{test}$ include: sensitivity of the various sensors; expected variance in the tension of the sprocket assembly 64; configuration of the sprocket assembly 64, and the like. In an embodiment of the invention, the $load_{test}$ is 2.27 Kg. Thus, the actuator 20 is modulated to retract the piston 18 until the load upon the chain 70 is essentially equal to the $load_{test}$.

At step 108 it is determined if the $load_{test}$ has stabilized. For example, the actuator 20 is controlled to maintain the position of the piston 18 and the sensed load is monitored. For example, if the sensed load fluctuates then it is determined that the $load_{test}$ has not reached an equilibrium state. In another example, if the sensed load essentially reaches an equilibrium then it is determined that the $load_{test}$ has stabilized. In response to determining the $load_{test}$ has not stabilized a wait time is allowed to elapse at step 110. In response to determining the $load_{test}$ has stabilized it is determined whether the sensed load is above a minimum load ($load_{test\ min}$) and below a maximum load ($load_{test\ max}$) at step 112.

At step 110 a wait time is allowed to elapse. For example, 10 seconds may be allowed to elapse. In general, the wait time associated with the $load_{test}$ is relatively less than the wait time associated with the $load_{1st}$ due to the substantial removal of slack in the sprocket assembly 64. Following this wait period, it is determined whether the $load_{test}$ has stabilized at step 108.

At step 112 it is determined whether the sensed load is above the $load_{test\ min}$ and below the $load_{test\ max}$. For example, if the sensed load is below 2.25 Kg then, it is determined that the $load_{test}$ is below the $load_{test\ min}$. In another example, if the sensed load is above 2.29 Kg then, it is determined that the $load_{test}$ is above the $load_{test\ max}$. In yet another example, if the sensed load is above 2.25 Kg and below 2.29 Kg then, it is determined that the sensed load is within a suitable range. In response to determining the sensed load is above the $load_{test\ max}$ or below the $load_{test\ min}$ then, the load placed upon the chain 70 is modulated at step 114. In response to determining the sensed load is above the $load_{test\ min}$ and below the $load_{test\ max}$ then, a second "test" load ($load_{test}$) is applied at step 116.

At step 114 the load upon the chain 70 is adjusted. For example, if the sensed load is below the $load_{test\ min}$ then, the actuator 20 is modulated to control the piston 18 to advance and thus, increase the load upon the chain 70. If, the sensed load is above the $load_{test\ max}$ then, the actuator 20 is modulated to control the piston 18 to retract and thus, decrease the load upon the chain 70. Following the step 114, it is determined whether the sensed load has stabilized at step 108.

At step 116 the sensed amount of travel ($travel_{sensed}$) displayed upon the display 56 is reset to zero. For example, the processor 76 modulates the display 56 to reset the $travel_{sensed}$.

At step 118 the piston 18 is retracted.

At step 120 it is determined whether the piston 18 has retracted sufficiently. In an embodiment of the invention, the piston 18 is retracted until the contact pad 52 looses contact with the chain 70. In this regard, the indicator 26 may emit light in response to the contact pad 52 being in contact with the chain 70. Therefore, in response to a lack of light being emitted form the indicator 26, it may be determined that the contact pad 52 is essentially not in contact with the chain 70. In another embodiment of the invention, the piston 18 is retracted until a third load is achieved. For example, the actuator 20 is modulated to control the piston 18 to retract until a load of 0.5 kg is sensed. In response to determining the piston 18 has not retracted sufficiently, the piston 18 is further retracted at step 118. In response to determining the piston 18 has retracted sufficiently, it is determined whether the $travel_{sensed}$ is greater than a minimum amount of travel ($travel_{min}$) and less than a maximum amount of travel ($travel_{max}$) at step 122.

At step 122 it is determined whether the $travel_{sensed}$ is greater than the $travel_{min}$ and less than the $travel_{max}$. In this regard, the $travel_{min}$ and the $travel_{max}$ are generally based upon a plurality of factors. Examples of factors upon which the $travel_{min}$ and the $travel_{max}$ are based include system application, chain characteristics (length, width, strength, flexibility, and the like), sprocket characteristic, bearing characteristics, system optimization, and the like. In response to determining the $travel_{sensed}$ is greater than the travel$_{min}$ and less than the travel$_{max}$, it is determined that the travel$_{sensed}$ is recorded at step 124. In response to determining the travel$_{sensed}$ is less than or equal to the travel$_{min}$ or greater than or equal to the travel$_{max}$, the chain tension is adjusted at step 126.

At step 124 the travel$_{sensed}$ is recorded. For example, the user reads the value of the travel$_{sensed}$ from the display 56 and record this amount into a log book. In another example, the processor 76 stores the travel$_{sensed}$ to a file in the memory 80 and/or forwards the travel$_{sensed}$ across a network to one or more suitably configured devices. Following the step 124 the CTMD 10 may be removed from the sprocket assembly 64 and idle or turn off until the method 94 is initiated again.

At step 126 the sprocket assembly 64 is adjusted. For example, if it is determined that the travel$_{sensed}$ is less than or equal to the travel$_{min}$ then, the sprocket assembly 64 is adjusted to decrease the tension applied to the chain 70 and thereby increase the travel$_{sensed}$. Following the step 126 the first load is applied to the chain 70 at step 96.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tension evaluator comprising:
   an actuator to apply a first load and a second load to a chain, the first load being configured to pre-load the chain, the second load being configured to evaluated tension in the chain, the chain being moved a first amount of deflection in response to the first load and the chain being moved a second amount of deflection in response to the second load;
   a first sensor to sense an event, the event comprising loss of contact with the chain, wherein a third amount of deflection is associated with the event; and
   a second sensor to sense an amount of travel of the chain between the second amount of deflection and the third amount of deflection.

2. The tension evaluator according to claim 1, wherein the first load is relatively greater than the second load.

3. The tension evaluator according to claim 1, wherein the first sensor transmits a signal in response to the sensed event.

4. The tension evaluator according to claim 3, wherein the first sensor comprises a contact pad being disposed between the chain and the actuator and being controlled to move by the actuator.

5. The tension evaluator according to claim 4, wherein the event comprises detachment of the contact pad from the chain.

6. The tension evaluator according to claim 1, further comprising a third sensor to sense opposition of the chain to load applied by the actuator.

* * * * *